US012800902B2

(12) United States Patent
Guerra et al.

(10) Patent No.: US 12,800,902 B2
(45) Date of Patent: Nov. 17, 2026

(54) ANALOG AND DIGITAL MICROSCOPE ASSEMBLY

(71) Applicant: CLEMENTONI S.P.A., Recanati (IT)

(72) Inventors: Lorenzo Guerra, Biella (IT); Alessia Giordani, Osimo (IT)

( * ) Notice: Subject to any disclaimer, the term of this patent is extended or adjusted under 35 U.S.C. 154(b) by 0 days.

(21) Appl. No.: 19/276,198

(22) Filed: Jul. 22, 2025

(65) Prior Publication Data

US 2026/0063887 A1 Mar. 5, 2026

(30) Foreign Application Priority Data

Sep. 5, 2024 (IT) ........................ 102024000019828

(51) Int. Cl.

*G02B 21/36* (2006.01)
*G02B 21/02* (2006.01)
*G02B 21/06* (2006.01)
*G02B 21/26* (2006.01)
*G02B 21/34* (2006.01)

(52) U.S. Cl.

CPC ......... *G02B 21/362* (2013.01); *G02B 21/025* (2013.01); *G02B 21/06* (2013.01); *G02B 21/26* (2013.01); *G02B 21/34* (2013.01); *G02B 21/368* (2013.01)

(58) Field of Classification Search

None

See application file for complete search history.

(56) References Cited

U.S. PATENT DOCUMENTS

2013/0016963 A1 1/2013 Miller
2015/0054935 A1* 2/2015 Muramatsu ............ G02B 21/24 359/392

FOREIGN PATENT DOCUMENTS

KR 20160008263 A 1/2016

OTHER PUBLICATIONS

Screen captures from YouTube video clip entitled “Bresser Teleskop Smartphone-Halter” 1 page, uploaded on Mar. 2, 2016 by user “Bresser”. Retrieved from Internet: <https://www.youtube.com/watch?v=73OLdxM6Q9A>. [Background Art Discussed in Application].

(Continued)

*Primary Examiner* — Nam D Pham
(74) *Attorney, Agent, or Firm* — Egbert, McDaniel & Swartz, PLLC

(57) ABSTRACT

A microscope assembly includes: a main body with a connector, an analog optical assembly with a monocle having a connector suitable for being removably connected to the connector of the main body for operating in analog mode; a digital optical assembly having a connector suitable for being removably connected to the connector of the main body for operating in digital mode; and a smartphone having a display and a wireless transceiver; the digital optical unit including a camera of digital type with a wireless transmitter configured to communicate with the wireless transceiver of the smartphone, and a holder suitable for holding the smartphone.

10 Claims, 12 Drawing Sheets

(56) References Cited

OTHER PUBLICATIONS

Screen captures from YouTube video clip entitled "Bresser WifiCamera—Telescope-Camera" 1 page, uploaded on Jan. 9, 2017 by user "Bresser". Retrieved from Internet: <https://www.youtube.com/watch?v=nYBPVPvBgUI>. [Background Art Discussed in Application].

Screen captures from YouTube video clip entitled "M Eyepiece Camera Installation Instructions" 1 page, uploaded on Oct. 9, 2009 by user "bigcatchusa". Retrieved from Internet: <https://www.youtube.com/watch?v=NuwY7ZQKSQQ>. [Background Art Discussed in Application].

* cited by examiner

ANALOG AND DIGITAL MICROSCOPE ASSEMBLY

CROSS-REFERENCE TO RELATED APPLICATIONS

Not applicable.

FIELD OF THE INVENTION

The present invention relates to an analog and digital microscope.

BACKGROUND OF THE INVENTION

Analog microscopes provided with an optical assembly with magnifying lenses suitable for magnifying the contents of a slide arranged in the microscope are known.

Digital microscopes equipped with a digital camera and a display are known. The camera is suitable for framing the contents of a slide arranged in the microscope, and the display shows the magnified image of the contents of the slide.

These two types of microscopes are quite distinct from each other and obviously have a totally different operation. Therefore, if users want a digital microscope and an analog microscope, they are forced to purchase two types of microscopes.

In addition, both analog and digital microscopes are unable to give other information in addition to the magnified view of the specimen. Analog microscopes generally have a memory card wherein the magnified images are stored. Such a memory card can be removed from the digital microscope and transferred to a PC where the user can analyze the images with appropriate software programs. Obviously, the transfer of images from the digital microscope to the computer and the analysis of the images with suitable software programs installed in the computer is a time-consuming and complex operation.

KR20160008263A discloses a method for creating a microscope image displayed on the screen of a mobile phone using wireless communications.

US2013016963A1 discloses a device used for fastening a plurality of imaging units of mobile phones equipped with camera to optical systems, such as microscopes.

In a YouTube video, Bresser: 'Bresser Teleskop Smartphone-Halter' discloses a holder for a smartphone for connection to a telescope.

In a YouTube video, Bresser: 'Bresser Wi-fi Camera-Telescope-Camera," discloses a camera for connection to a telescope.

In a YouTube video, bigcatchUSA: 'EM Eyepiece Camera Installation Instructions' discloses instructions for installing a camera in a microscope.

SUMMARY OF THE INVENTION

The purpose of the present invention is to eliminate the drawbacks of the prior art by providing a versatile microscope assembly that is capable of being converted into analog or digital in a simple, quick and intuitive manner, as needed.

Another purpose is to provide such a microscope assembly that is capable of interfacing with a mobile phone.

Another purpose is to provide such a microscope assembly that is capable of providing other information to the user in addition to sample magnification.

These purposes are achieved in accordance with the invention with the features of the appended independent claim 1.

Advantageous achievements of the invention appear from the dependent claims.

BRIEF DESCRIPTION OF DRAWINGS

Further features of the invention will appear clearer from the following detailed description, which refers to a purely illustrative and therefore non-limiting embodiment thereof, illustrated in the appended drawings.

DETAILED DESCRIPTION OF THE INVENTION

Figure 1:
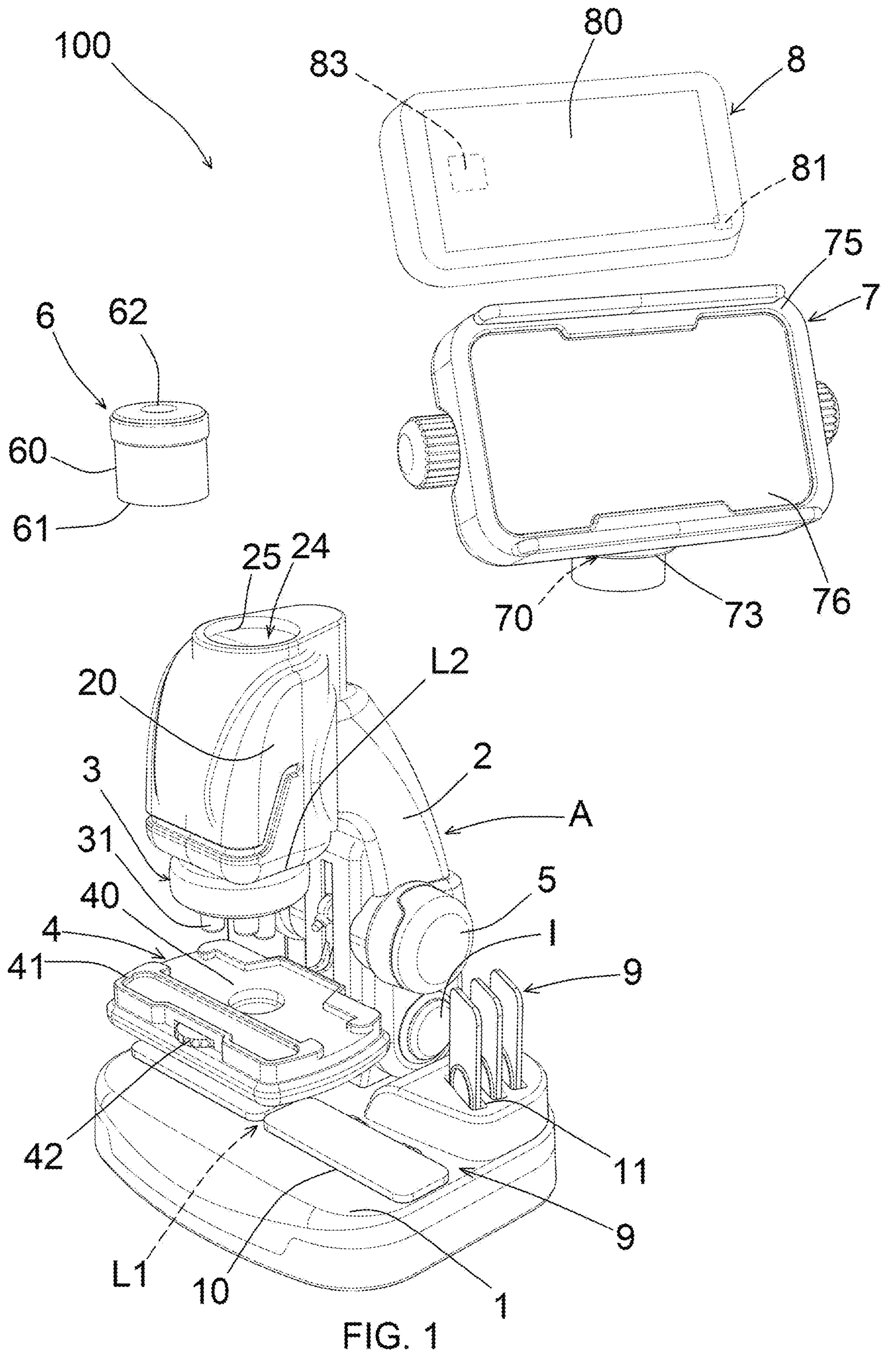
FIG. 1 is an exploded perspective view, illustrating several elements of the microscope assembly according to the invention.

With the aid of the Figures, the microscope assembly according to the invention, which is comprehensively denoted with reference numeral 100, is described.

Referring to FIG. 1, the microscope assembly (100) comprises a main body (A) with a connector (25) to which an analog optical assembly (6) and a digital optical assembly (7) can be removably connected.

The digital optical assembly (7) has a holder (75) suitable for holding a smartphone (8) with a display (80) so that the display (80) of the smartphone can be seen by a user.

Figure 2:
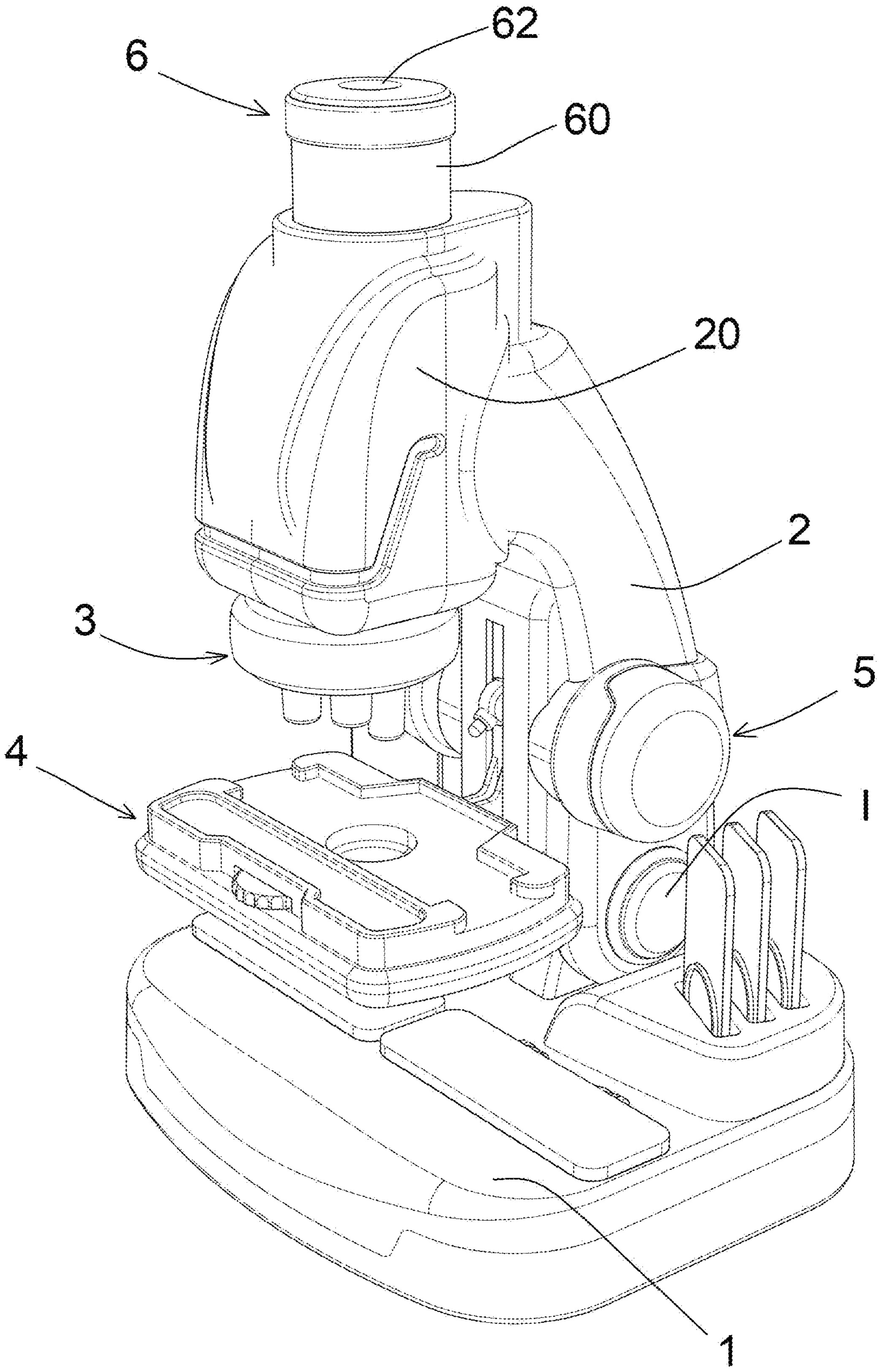
FIG. 2 is a perspective view, illustrating the microscope assembly of FIG. 1 in analog configuration.

FIG. 2 illustrates the microscope assembly (100) in analog mode, wherein the analog optical assembly (6) is coupled to the main body (A) of the microscope.

Figure 3:
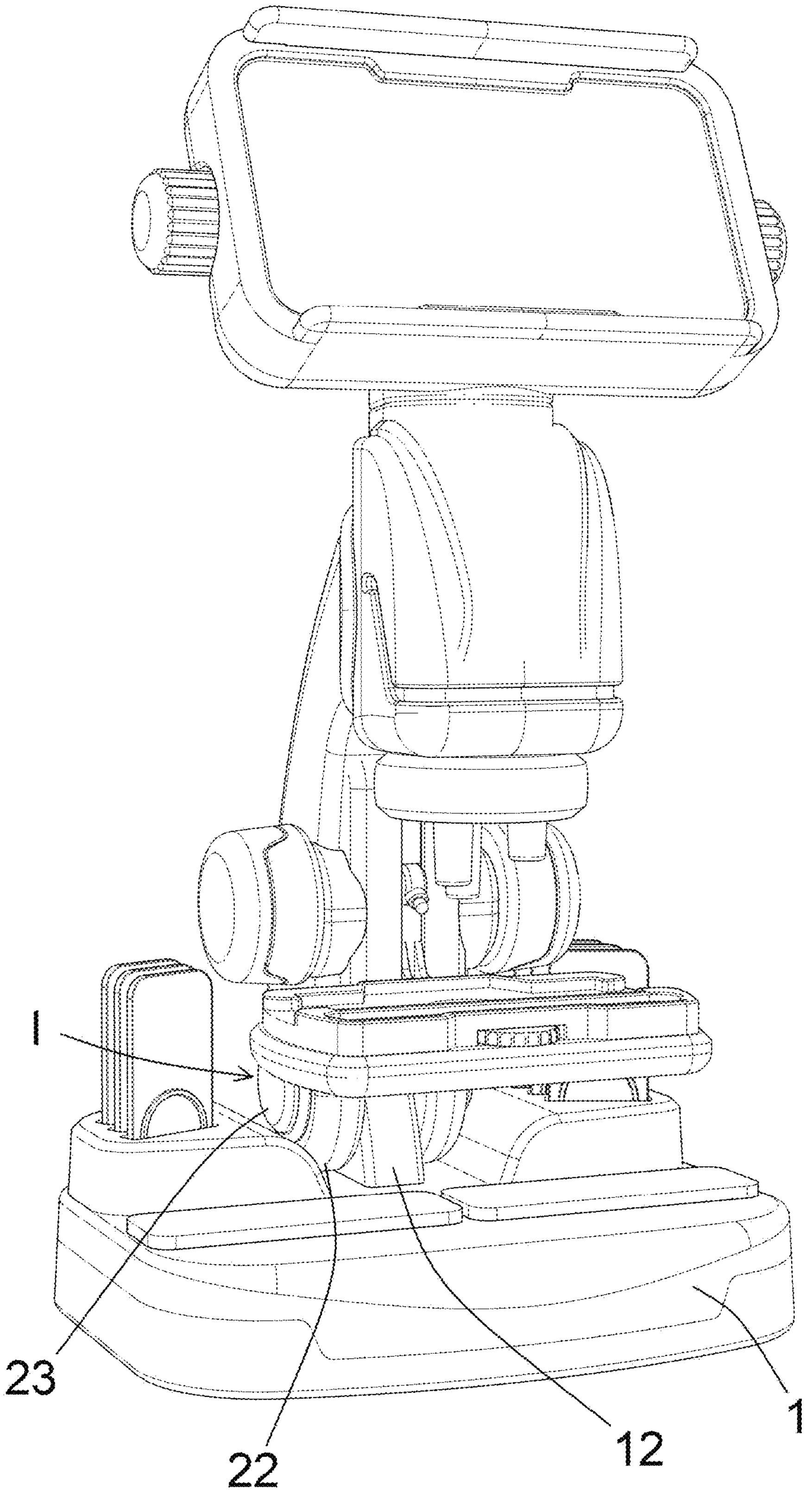
FIG. 3 is a perspective view, illustrating the microscope assembly of FIG. 1 in digital configuration.

FIG. 3 illustrates the microscope assembly (100) in digital mode, wherein the digital optical assembly (7) is coupled to the main body (A) of the microscope.

The main body (C) comprises a base (1) suitable for being positioned on a horizontal plane. The base (1) has housings (10, 11) suitable for accommodating slides (9) suitable for containing specimens to be analyzed with a microscope or information codes. The base (1) comprises first recessed seats (10) to accommodate slides (9) arranged horizontally, and second slotted seats (11) to accommodate slides (9) arranged vertically.

Figure 4:
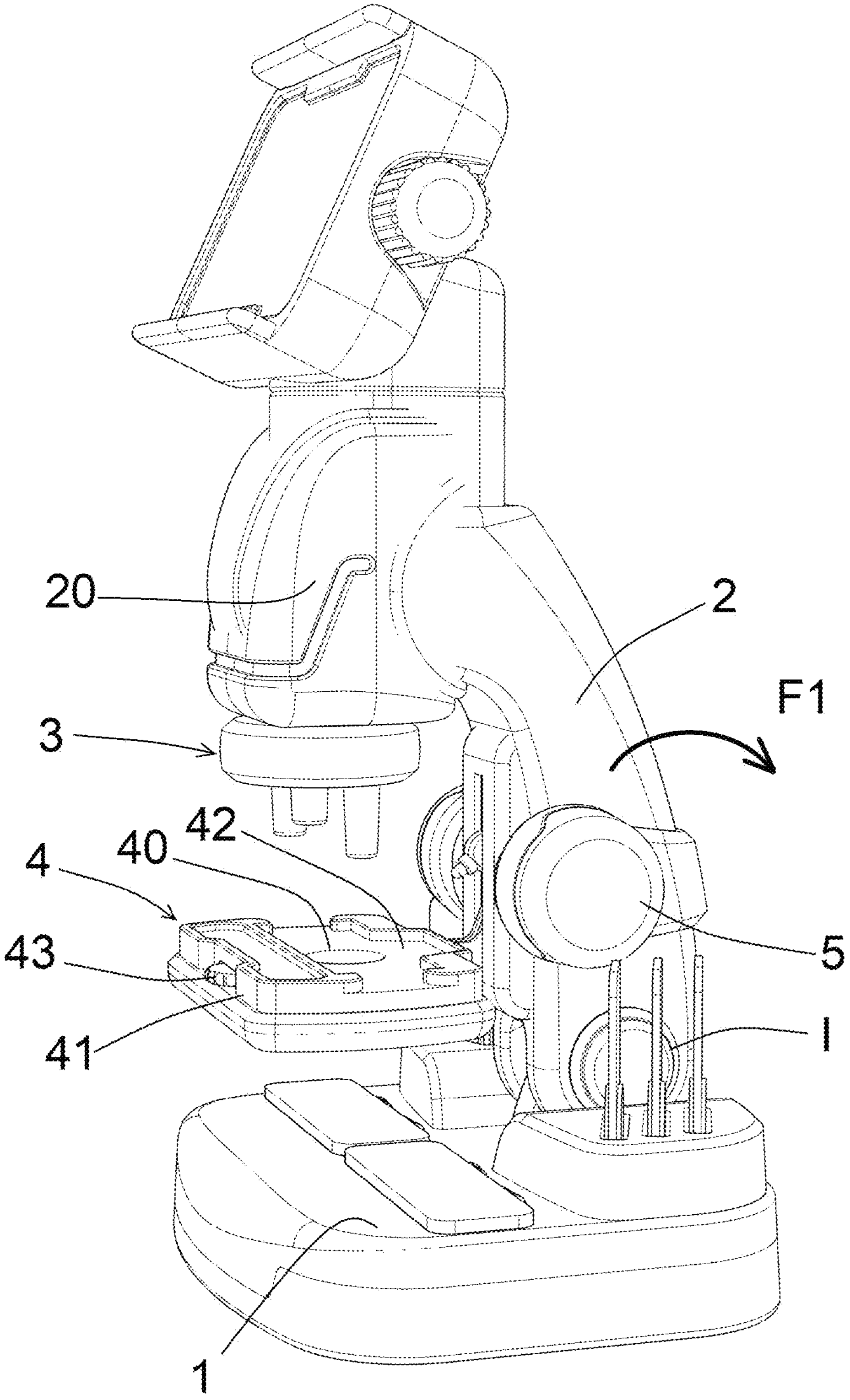
FIG. 4 is a side perspective view, illustrating a possible tilt of the column of the microscope assembly according to the invention.

A column (2) is hinged to the base (1) by means of a hinge (I) having a horizontal axis parallel to the base (1). In this way, as shown in FIG. 4, the column (2) can be tilted relative to the base (1) in the direction of arrow F1.

As shown in FIG. 3, the hinge (I) comprises a bushing (12) that protrudes from the base (1) and is inserted into a fork (22) of the column and a pin (23) attached to the fork (22) of the column and arranged in the bushing (12) of the base in such a way to turn inside the bushing of the base.

Referring to FIG. 1, the column (2) is connected at the top to a housing (20) having a parallelepiped shape, which internally defines a dark room. The housing (20) has an axial channel (24) arranged vertically. The connector (25) is arranged at an upper end of the axial channel (24) of the housing (20).

A lower optical assembly (3) comprising at least one magnifying lens (31) is mounted in a lower end of the housing (20), so that the axial channel (24) of the housing communicates with a magnifying lens (31) of the optical assembly.

The lower optical assembly (3) is rotatably mounted under the housing (20) in such a way to rotate around a vertical axis.

Figure 5:
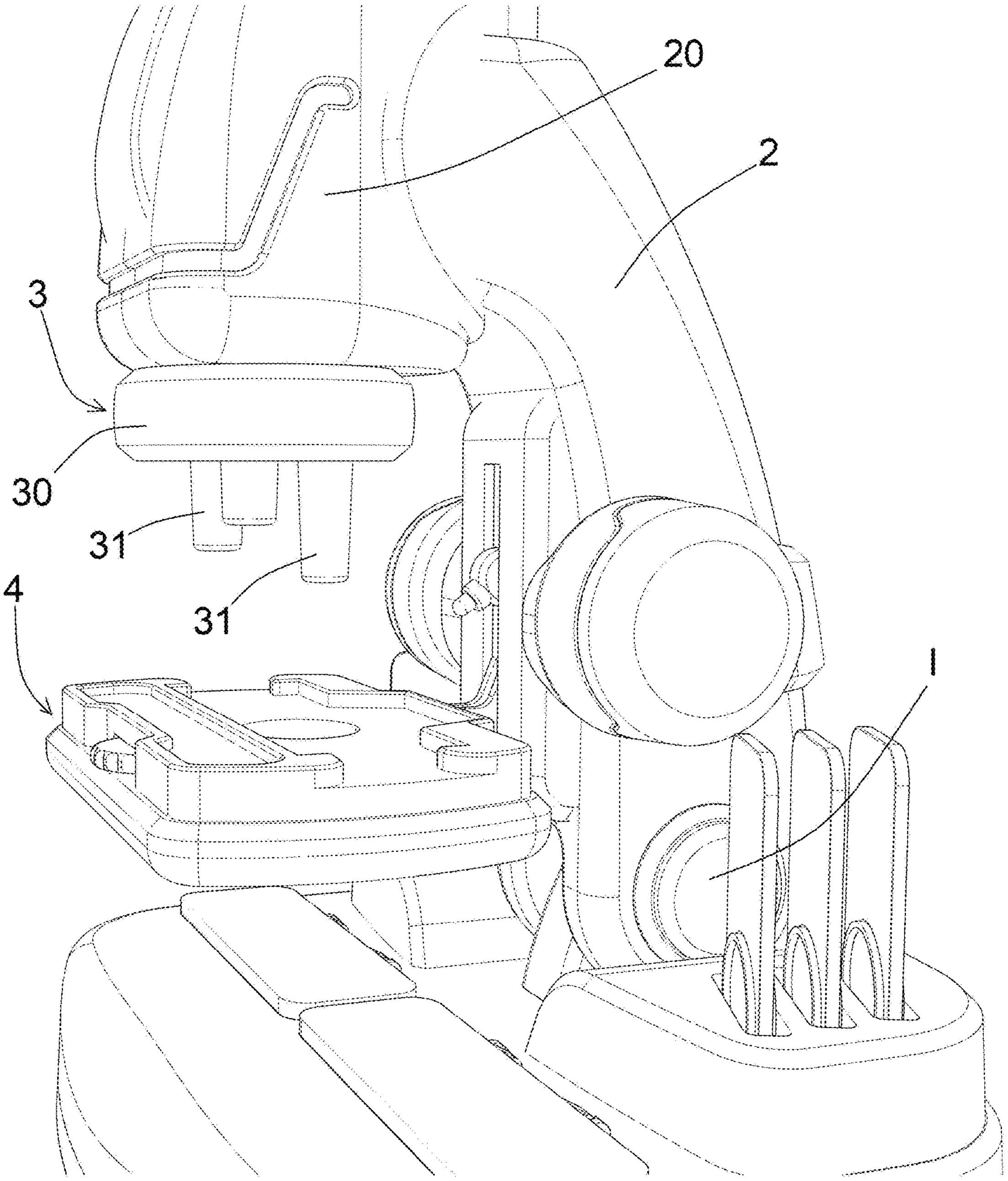
FIGS. 5 and 6 are enlarged details seen from different angles, illustrating the slide holder and the rotating optical assembly.

As shown in FIG. 5, the lower optical assembly (3) comprises a holder (30) from which a plurality of magnifying lenses (31) with different magnification factors protrudes inferiorly. The magnifying lenses (31) are arranged peripherally in the holder (30). So, by rotating the holder (30), a magnifying lens is disposed in register with the axial channel (24) of the housing (20).

Figure 6:
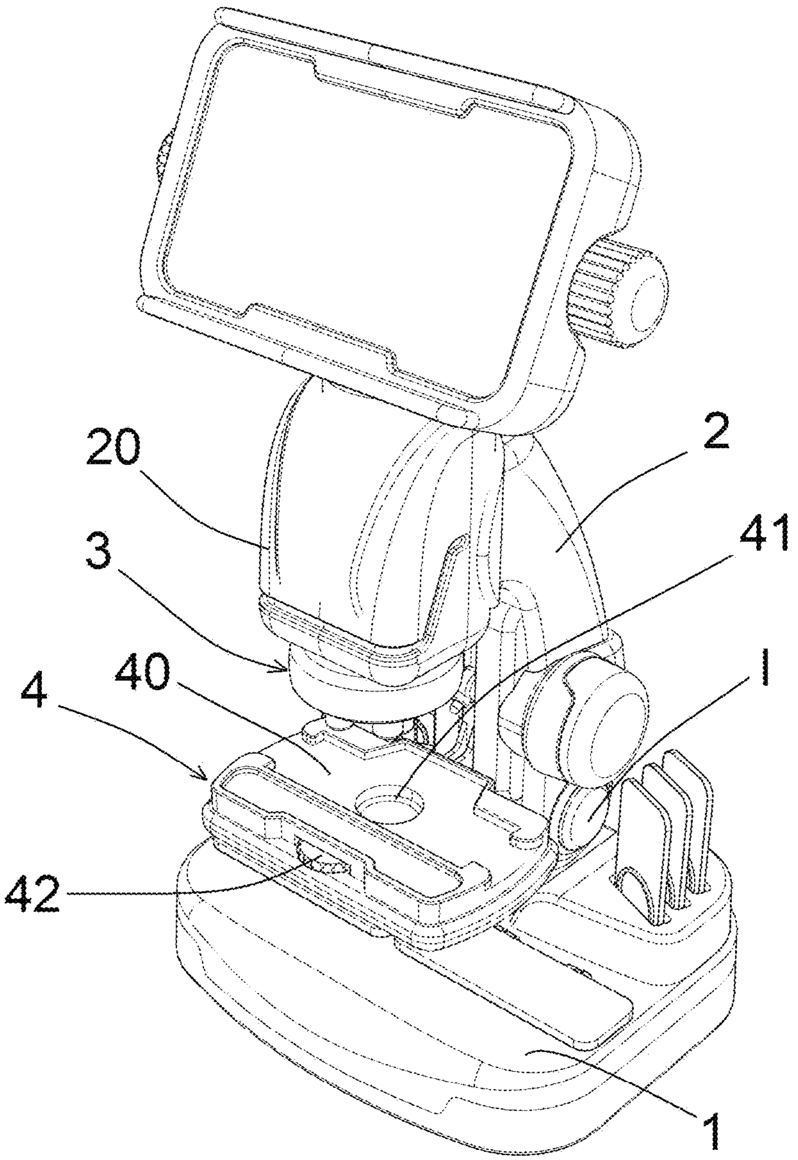

Referring to FIG. 6, a slide holder (4) is slidingly mounted on the column (2) in such a way to move between the base (1) and the lower optical assembly (3).

The slide holder (4) comprises a seat (40) suitable for accommodating a slide (9). The seat (40) has a central hole (41). The slide holder (4) comprises a metal ring (42) suitable for being operated by the user to focus the slide containing the element to be observed.

With reference to FIG. 1, a first lamp (L1) is mounted under the slide holder (4) to illuminate a slide (9) arranged on the slide holder from below in the case where the microscope assembly is in analog mode. A second lamp (L2) is mounted above the slide holder (4) to illuminate a slide (9) arranged on the slide holder from above in the case where the microscope assembly is in digital mode.

Figure 7:
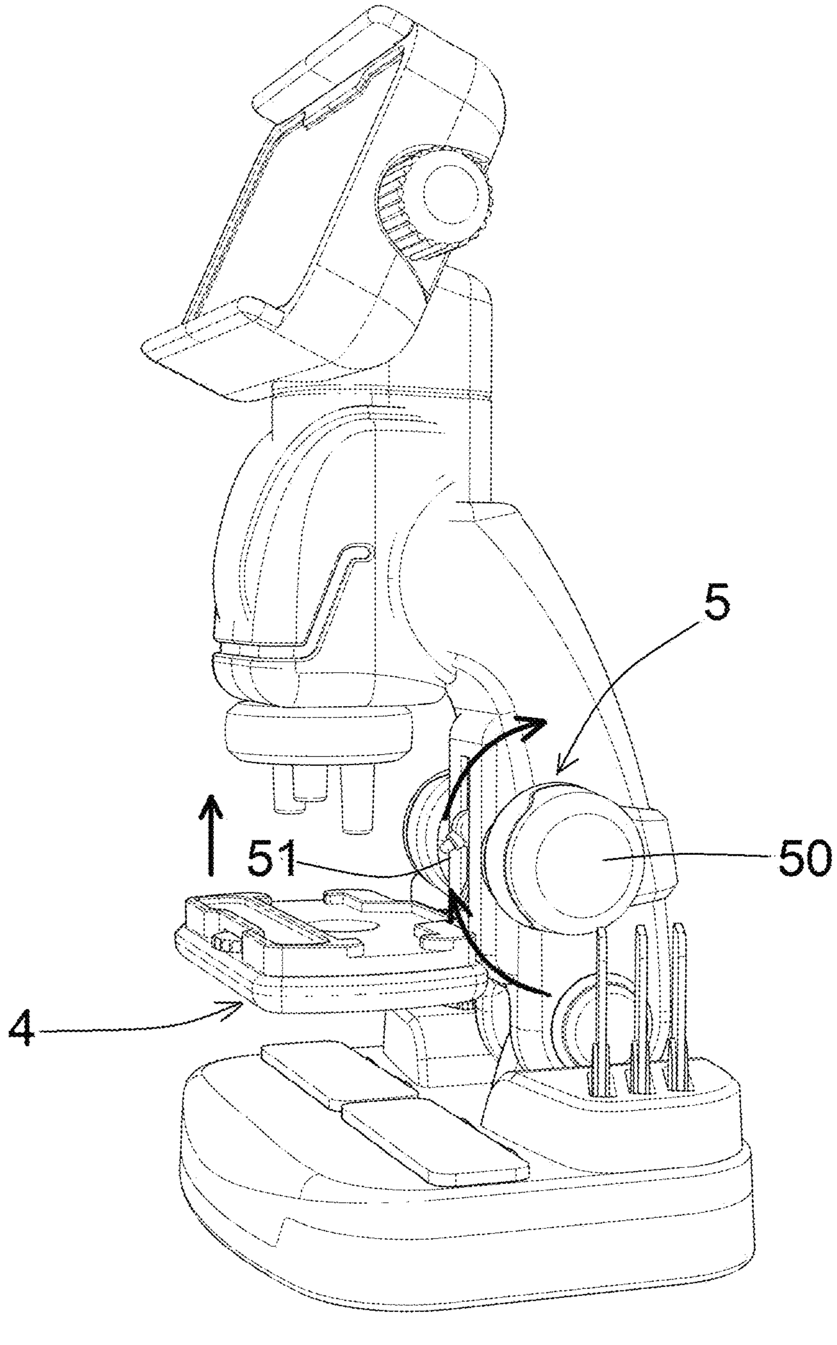
FIG. 7 is an enlarged detail, illustrating a movement of the slide holder.
Figure 8:
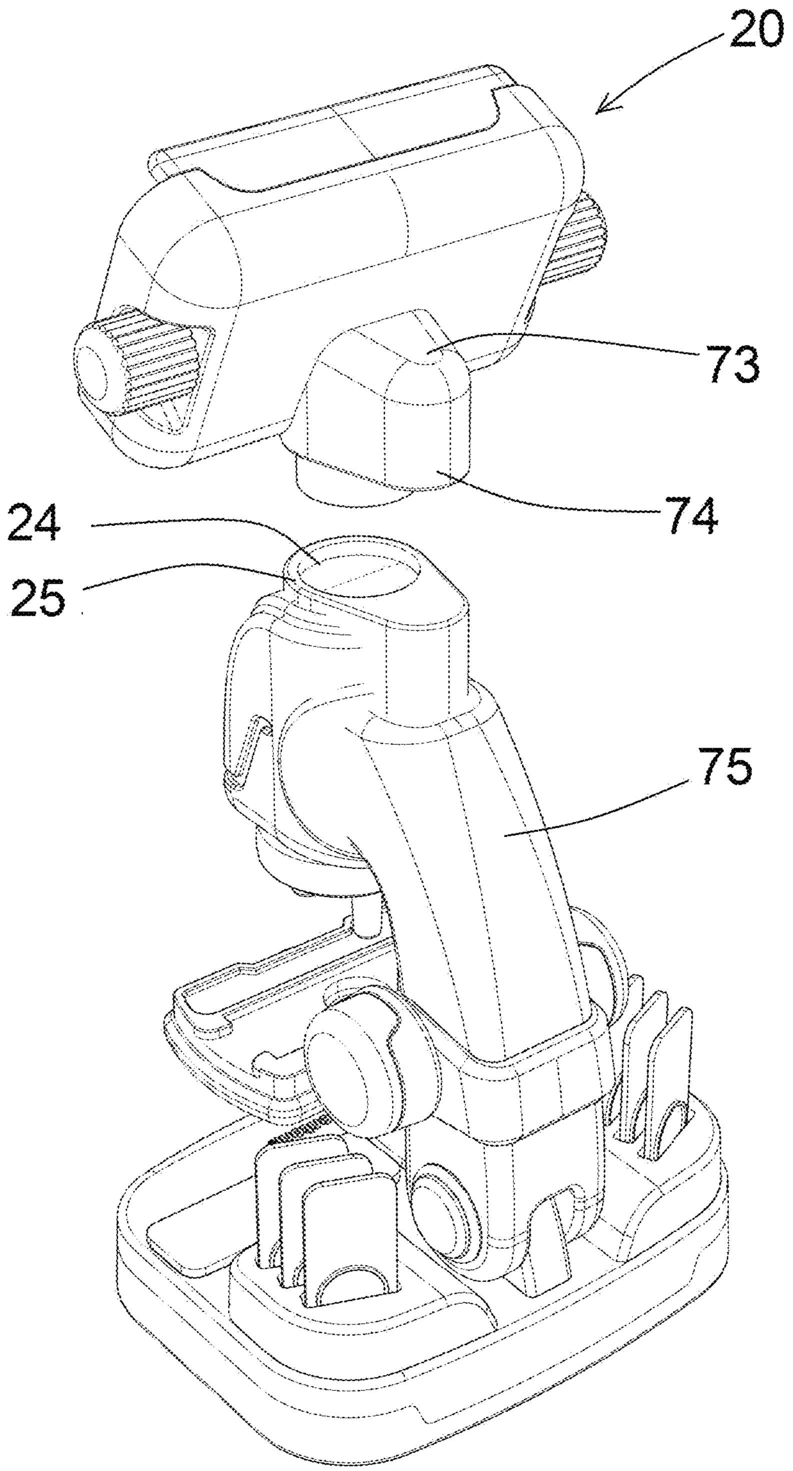
FIGS. 8 and 9 are two perspective views, illustrating the coupling of the digital optical assembly.
Figure 9:
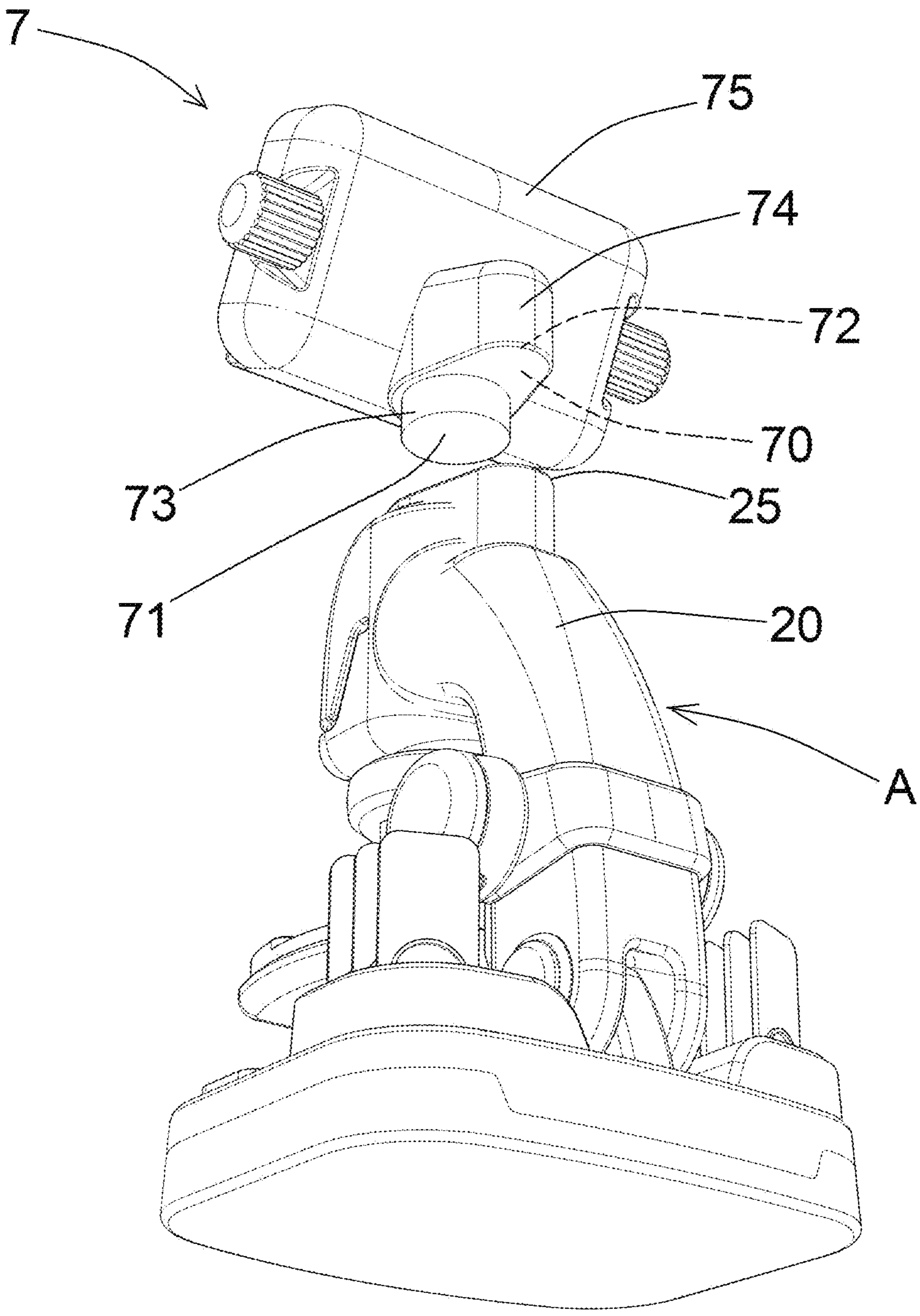

Referring to FIG. 7, adjustment means (5) adjust the vertical translation movement of the slide holder. The adjustment means (5) may comprise a knob (50) rotatable by the user. Motion transmission means (51) convert a rotary motion of the knob (50) into a vertical translation of the slide holder (4). The motion transmission means (51) may comprise a gear mounted on a shaft of the knob (50) that engages in a rack integral with the slide holder (4).

Referring to FIGS. 1 and 2, the analog optical assembly (6) comprises a monocle (60) wherein a magnifying lens system is arranged, which is suitable for interacting with a magnifying lens (31) of the lower optical assembly (3) so as to magnify a specimen contained in a slide (9) arranged on the slide holder (4). Given that the axial channel (24) of the housing (20) is empty, the lenses of the analog optical assembly (6) are in optical communication with a magnifying lens (31) of the lower optical assembly.

The monocle (60) of the analog optical assembly has a connector (61) arranged at its lower end for coupling with the connector (25) of the main body (A). The monocle (60) of the analog optical assembly has a hole (62) arranged at its upper end to allow for the user's vision.

Referring to FIGS. 1, 3, 8 and 9, the digital optical assembly (7) comprises a camera (70) of digital type equipped with a lens (71) (FIG. 9) suitable for facing the axial channel (24) of the housing. The camera (70) has a wireless transmitter (72), such as a Bluetooth or Wi-Fi transmitter, that is suitable for communicating in wireless mode with the smartphone (8).

The lens (71) of the camera is integrated into a connector (73) of the digital optical assembly suitable for coupling with the connector (25) of the main body. The camera (70) is arranged in a body (74) that protrudes rearward from the holder (75).

Figure 10:
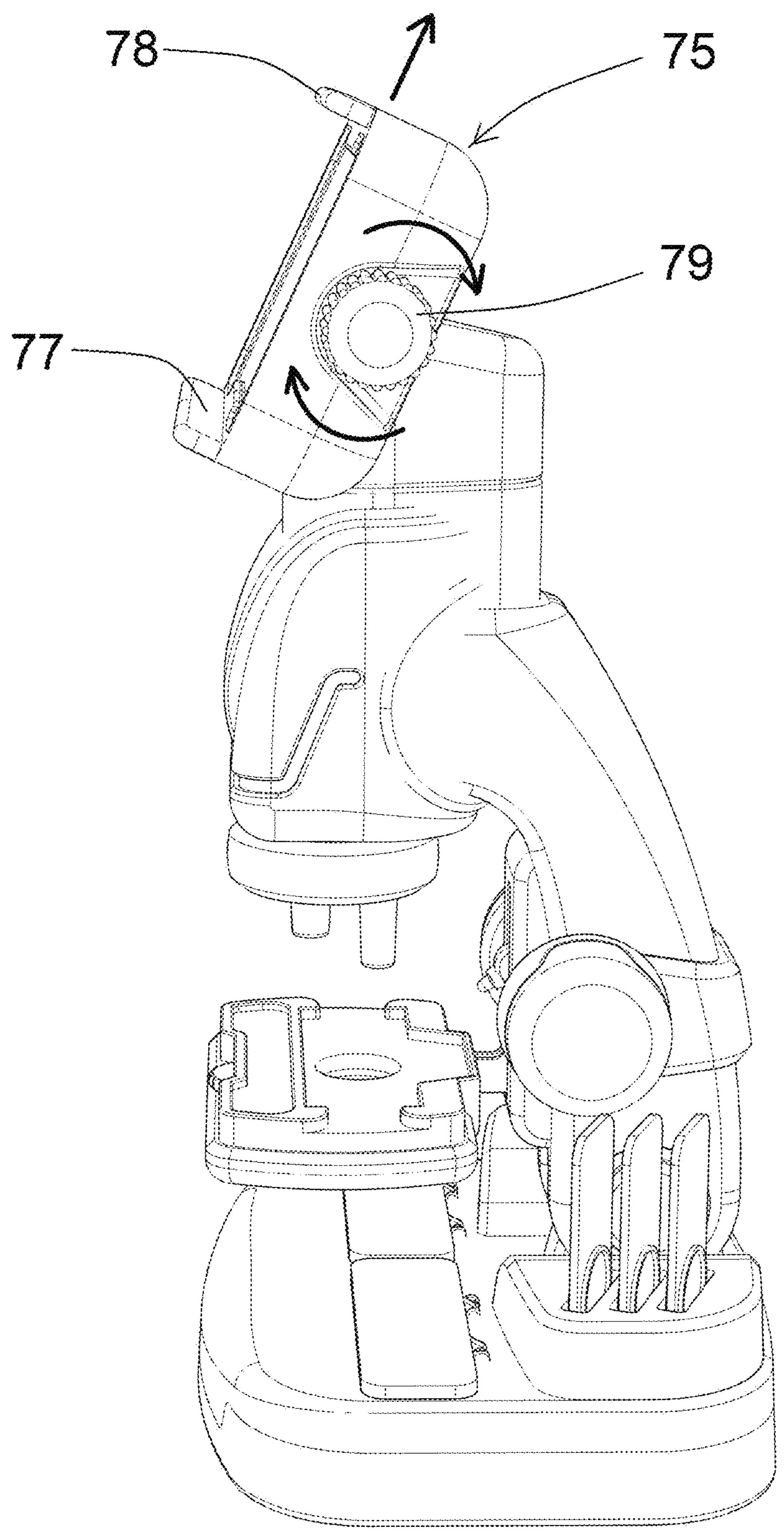
FIG. 10 is a side view, illustrating an adjustment of the holder of the digital assembly.
Figure 11:
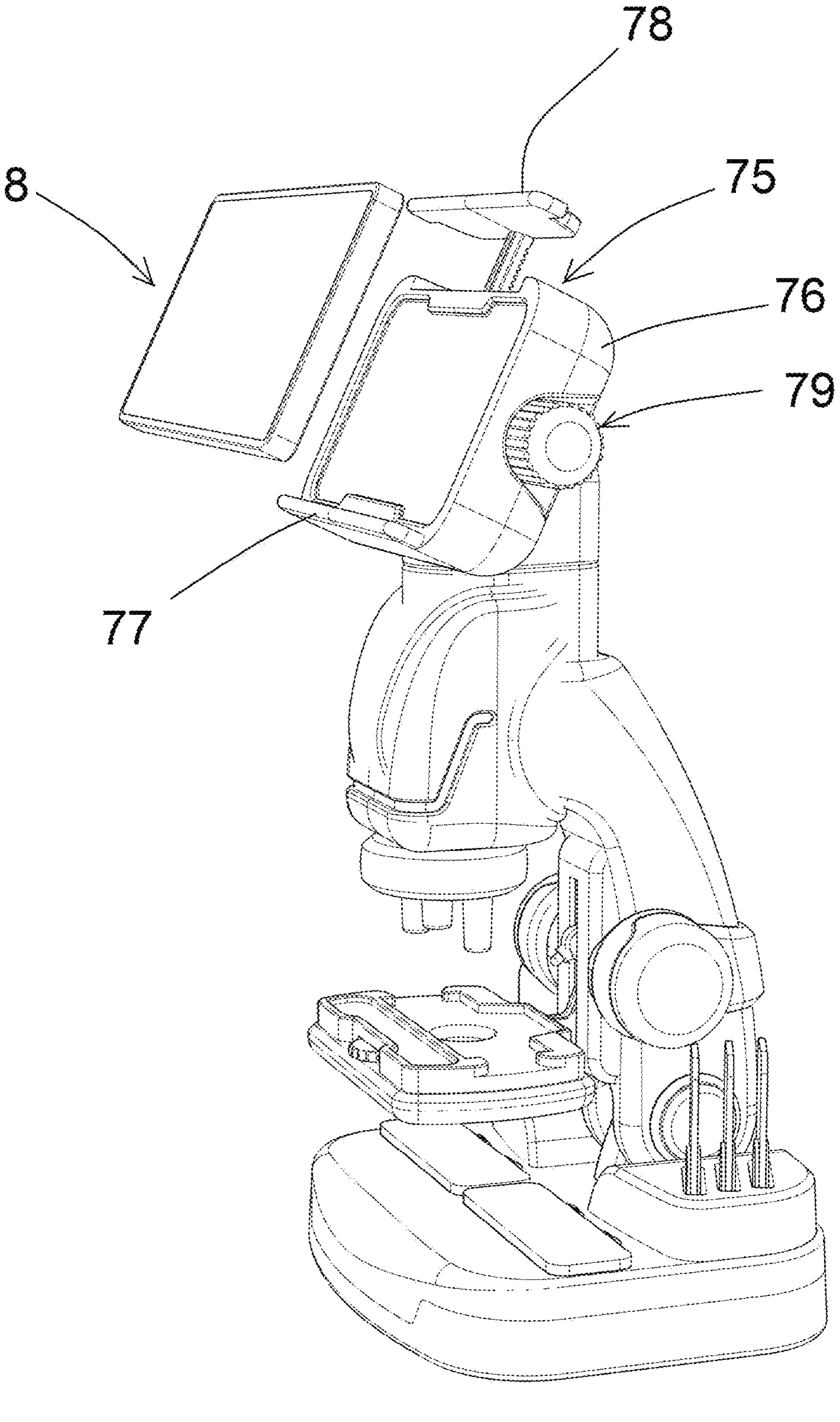
FIG. 11 is a perspective view, illustrating the coupling of a smartphone to the holder of the digital assembly.

Referring to FIGS. 1, 10 and 11, the holder (75) comprises a plate (76) having a rectangular shape with dimensions compatible with the commonly available smartphones.

A first wing (77) and a second wing (78) protrude anteriorly from the plate (76) of the holder so as to hold the smartphone (8). The second wing (78) is movably mounted with respect to the plate (76) of the holder so as to fit the dimensions of the smartphone.

Second adjustment means (79) adjust a movement of the second wing (78). The second adjustment means (79) may comprise a knob with an endless screw transmission system to move the second wing (78).

With reference to FIG. 1, the smartphone (8) has a wireless transceiver (81), such as a Bluetooth or Wi-Fi transceiver, suitable for communicating in wireless mode with the wireless transmitter (72) of the camera.

The smartphone (8) has a processing control unit wherein a software program (83) of application type (APP) is installed, which is suitable for receiving digital files relative to images taken by the camera (70) and display such images contained in the digital files on the display (80) of the smartphone.

Figure 12:
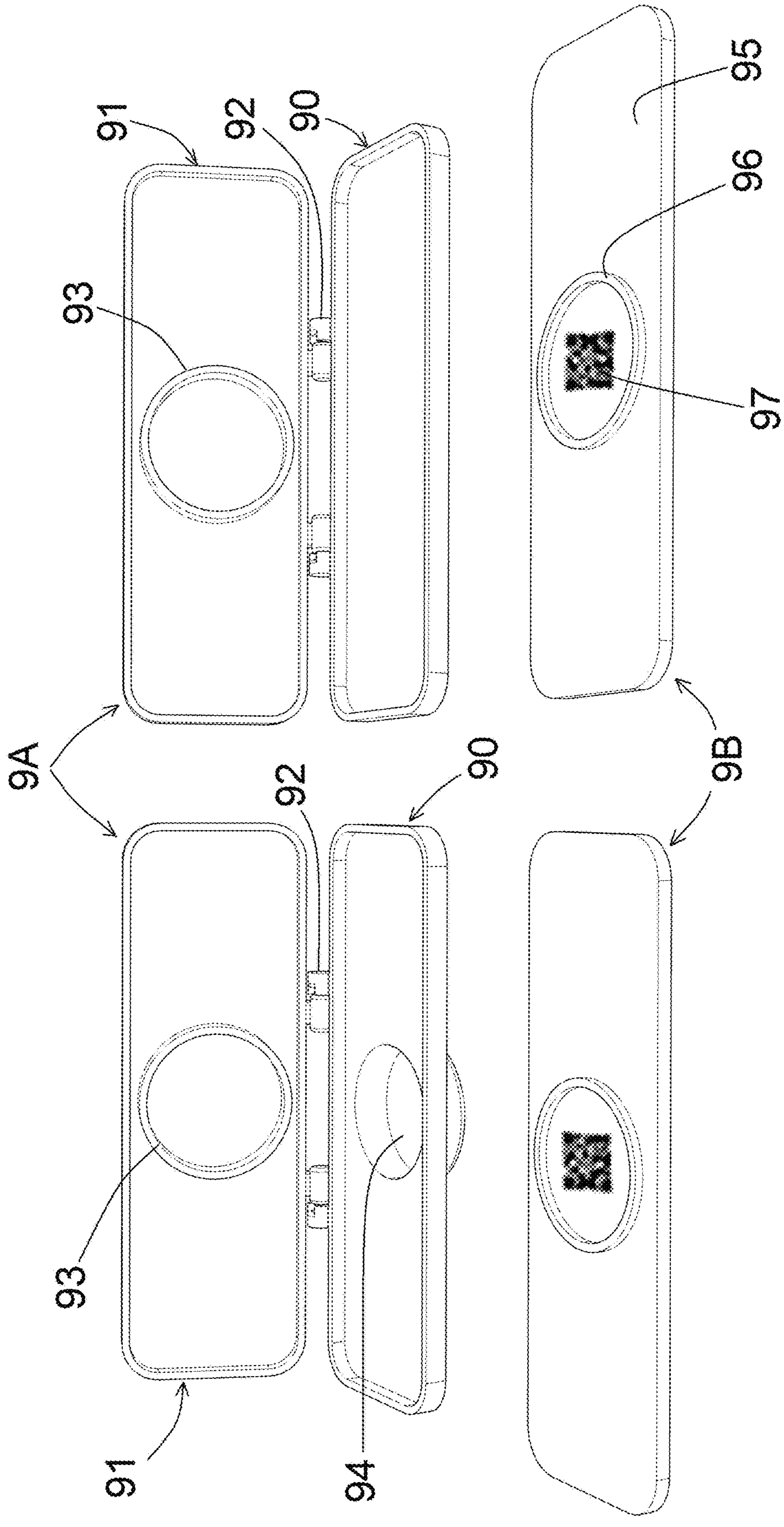
FIG. 12 is a plan view of some slides of the microscope assembly according to the invention.

With reference to FIG. 12, the slides (9) comprise two types of slides: empty slides (9A) and informative slides (9B).

The empty slides (9A) comprise a base (90) and a lid (91) hinged to the base (90) by means of a hinge (92). An annular collar (93) is provided in the lid (91) and defines a housing wherein the specimen to be observed is to be placed.

In a slide, the base (90) has a flat surface. In another slide, the base (90) has a recessed seat (94) suitable for being inserted into the hole (41) of the seat of the slide holder.

The informative slides (9B) comprise a plate (95) with an annular collar (96) wherein a code (97), such as a QR-Code, is arranged.

By means of the software program (83), the smartphone (8) can interact with the camera (70) in two different modes:

- an observation mode, using a specimen in an empty slide (9A); or
- an information mode, using the informative slides (9B).

In the observation mode, the user selects a specimen to be observed, places said specimen in an empty slide (9A), and places the slide with the specimen in the seat (40) of the slide holder. At this point, the user can observe the enlarged specimen that was captured by the camera (70) on the display (80) of the smartphone. Using the software program (83), the user can zoom in and out on the image shown on the display and also take photos or videos of the image shown on the display.

In the information mode, the user places an informative slide (9B) on the slide holder (4). The camera (70) scans the code (97), and the application program (83) receives an image of the code (97) and opens a section of multimedia contents on the topic of the scanned slide. Such multimedia contents may include videos, photos, insights, quizzes, etc. . . . .

Equivalent variations and modifications may be made to the present embodiment of the invention, within the reach of a person skilled in the art, but still within the scope of the invention as expressed by the appended claims.

The invention claimed is:

1. Microscope assembly comprising:

a main body with a connector;

an analog optical assembly comprising a monocle having a connector suitable for being removably connected to the connector of the main body for operating in analog mode;

a digital optical unit having a connector suitable for being removably connected to the connector of the main body for operating in digital mode; and a smartphone comprising a display and a wireless transceiver;

wherein said digital optical assembly comprises:

a camera of digital type with a wireless transmitter configured to communicate with the wireless transceiver of the smartphone; and a holder suitable for holding said smartphone so that the display of the smartphone is visible for a user.

2. The microscope assembly of claim 1, wherein said main body comprises:

a base suitable for being positioned on a horizontal plane;

a column hinged to the base by means of a hinge;

a housing connected to the column and having an axial channel open on top in correspondence of said connector of the main body and communicating inferiorly with a lower optical assembly comprising at least one magnifying lens.

3. The microscope assembly of claim 2, wherein said lower optical assembly comprises a plurality of magnifying lenses with different magnification factors, arranged in peripheral positions, and wherein said lower optical assembly is rotatably mounted with respect to said housing to select and arrange one of said magnifying lenses in register with said axial channel of said housing.

4. The microscope assembly of claim 2, further comprising a slide holder disposed below said lower optical assembly, said slide holder having a seat suitable for housing a slide.

5. The microscope assembly of claim 4, wherein said slide holder is mounted in such a way to slide vertically in said column and adjustment means regulate the movement of said slide holder.

6. The microscope assembly of claim 5, wherein said adjustment means comprise:

a knob rotatable by the user; and motion transmission means that convert a rotary motion of the knob into a vertical translation of the slide holder.

7. The microscope assembly of claim 4, comprising:

a first lamp mounted under the slide holder to illuminate a slide disposed on the slide holder from below in the case where the microscope assembly is in analog mode; and a second lamp mounted above the slide holder to illuminate a slide disposed on the slide holder from above in the case where the microscope assembly is in digital mode.

8. The microscope assembly of claim 1, wherein said holder comprises:

a plate having a rectangular shape with dimensions compatible with a smartphone;

a first wing and a second wing projecting anteriorly from the plate of the holder so as to hold the smartphone, wherein the second wing is movably mounted relative to the plate of the holder; and second adjusting means suitable for adjusting a movement of the second wing.

9. The microscope assembly of claim 1, wherein said base comprises first recessed seats for holding slides arranged horizontally and second slotted seats for holding slides arranged vertically.

10. The microscope assembly of claim 1, comprising informative slides having a code relative to a specific topic, said smartphone having a software program suitable for reading codes, said camera of the digital optical assembly being configured to scan the code and send an image of the code to said smartphone, said software program of the smartphone being configured to receive an image of the code and open a section of multimedia contents on the topic of the scanned slide.

* * * * *